June 12, 1962 V. M. THOMPSON 3,038,549
LIVESTOCK WEIGHING APPARATUS
Filed Aug. 4, 1958 3 Sheets-Sheet 3
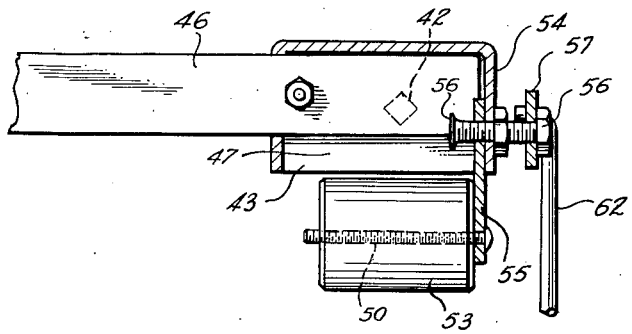
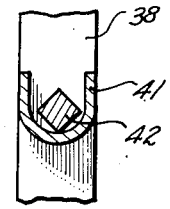
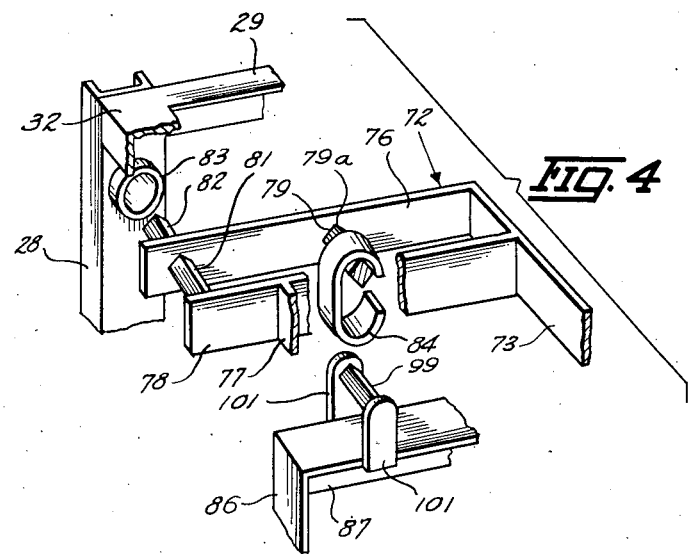
INVENTOR.
VERLE M. THOMPSON
BY Lowell & Henderson
ATTORNEY.

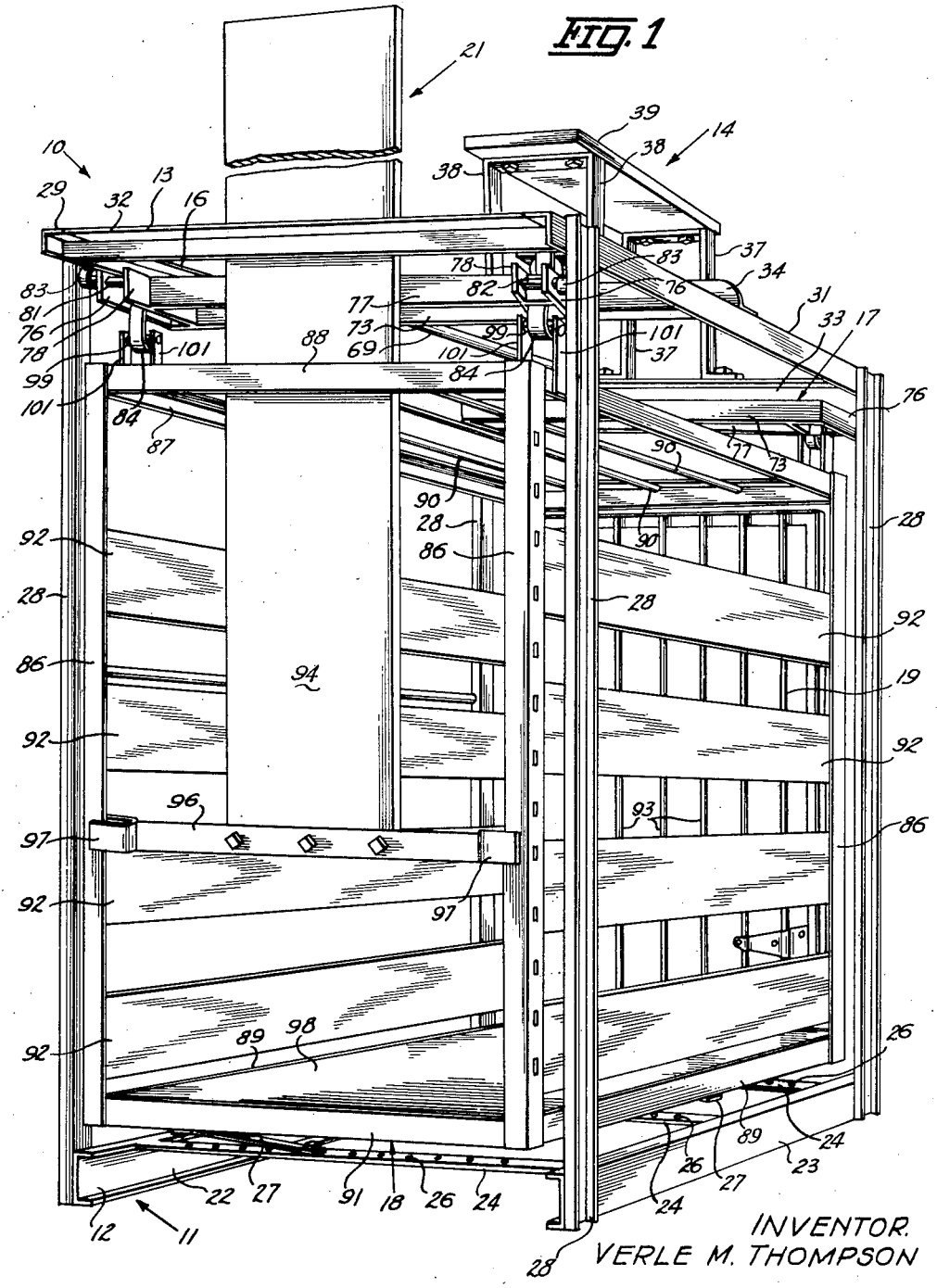

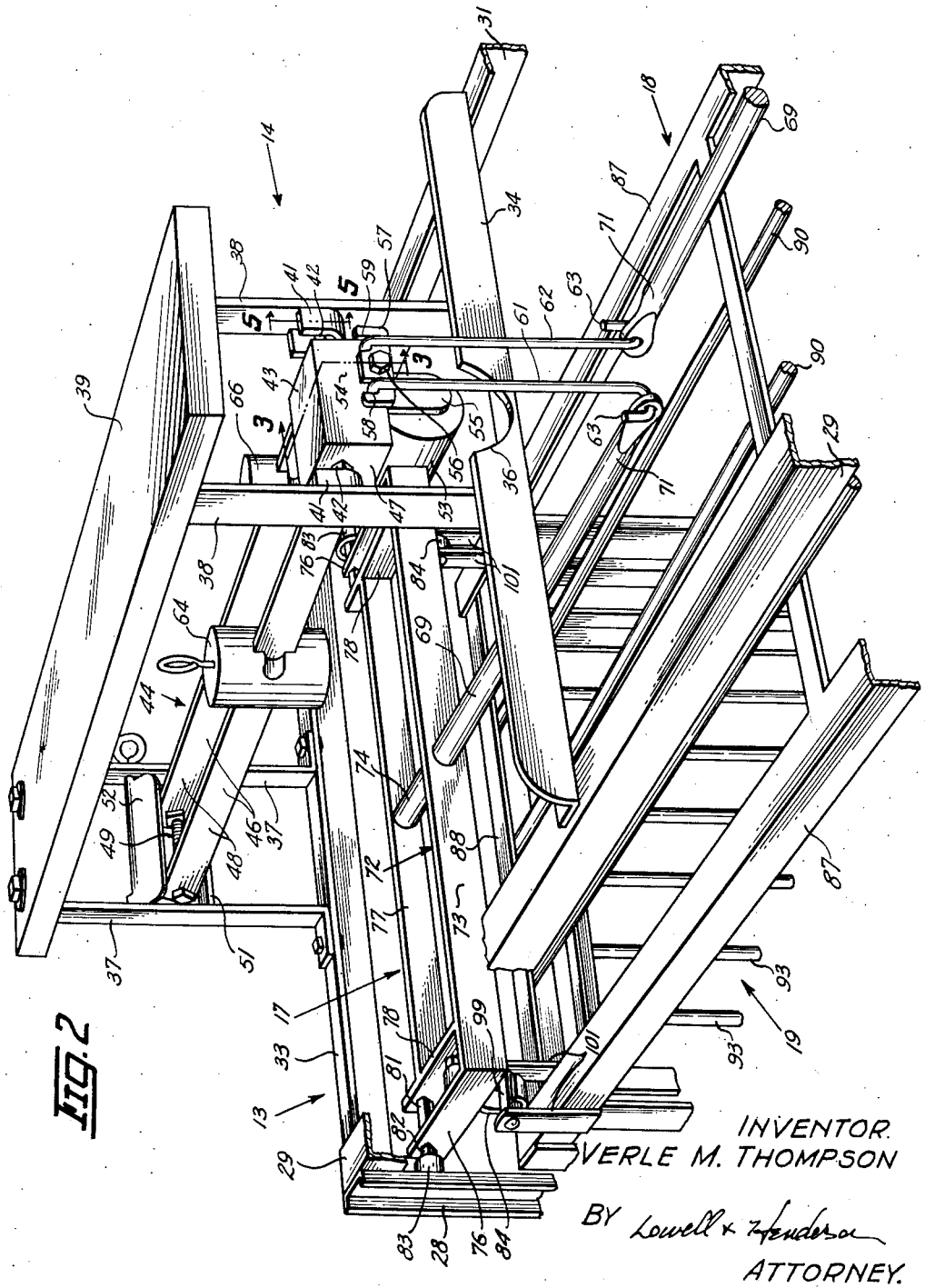

United States Patent Office 3,038,549
Patented June 12, 1962

3,038,549
LIVESTOCK WEIGHING APPARATUS
Verle M. Thompson, Minburn, Iowa
Filed Aug. 4, 1958, Ser. No. 752,860
1 Claim. (Cl. 177—246)

This invention relates to apparatus for weighing livestock and has as an object the provision of an improved weighing scale apparatus for such purpose.

Another object of this invention is to provide a weighing apparatus which will readily and accurately indicate the weight to be ascertained.

A further object of this invention is to provide a livestock weighing apparatus which is rugged, easy to use, relatively inexpensive to manufacture, and practical and efficient in operation.

These and other objects will be readily ascertained from the following description when taken in conjunction with the accompanying drawings, wherein:

FIG. 1 is a perspective view of a weighing scale apparatus embodying the features of this invention;

FIG. 2 is a fragmentary perspective view of a portion of the weighing apparatus, showing particularly the weight indicating unit, with parts being broken away for the purpose of clarity;

FIG. 3 is a sectional view taken along the line 3—3 of FIG. 2;

FIG. 4 is a perspective view in exploded form of the structure at one of the upper corners of the apparatus; and FIG. 5 is a sectional view taken along the line 5—5 of FIG. 2.

Referring to the drawings, the weighing scale apparatus 10 (FIG. 1) comprises generally a stationary box frame 11 including a right angular bottom frame device 12 connected to a right angular top frame device 13. A weight indicating unit 14 is mounted on top of the box frame 11 and is operatively connected to a pair of T-shaped weight transmitting units 16 and 17 which are rockably mounted on the top frame device 13 at each end thereof. A weight receiving unit or cage 18, having a hinged gate 19 (FIG. 2) at one end and a vertically sliding door 21 at the other end, is suspended from the T units 16 and 17 for receiving therein an animal to be weighed.

The bottom frame device 12 (FIG. 1) comprises a pair of channel shaped side portions 22 and 23 arranged in a parallel manner and interconnected by a plurality of transversely extended brace members 24 each of which is provided with a plurality of longitudinally spaced openings 26. A hold down unit 27 may then be adjustably secured to each brace member 24 for connection to the cage 18.

The top frame device 13, FIGS. 1 and 2, connected to the bottom frame device 12 by four upstanding posts 28, comprises parallel side members 29 and 31 joined at their ends by a pair of end members 32 and 33 whereby to form a rectangular top frame. An L-shaped member 34 (FIG. 2) having a centrally located semi-circular cutout 36 formed therein is secured across the side members 29 and 31 substantially intermediate their ends for a purpose hereinafter described.

The weight indicating unit 14 (FIG. 2) includes four upright members 37 and 38 of equal length. Two of the members 37 are mounted in transversely spaced relation on the end member 33 and the other two members 38 are mounted in transversely spaced relation on the transverse member 34. A shelf board 39 is secured on the top of all four members 37 and 38. A pair of U-shaped elements 41 (FIGS. 2 and 5) are mounted face-to-face on the members 38 whereby to receive therein wedge shaped, knife edged projections 42 extended outwardly from each side of a box-like member 43.

The member 43 is located at one end of a scale beam unit 44 which includes further a pair of transversely spaced, parallel scale beam arms 46 each secured at one end inside the member 43 (FIG. 3) to each side 47 thereof. The arms 46 are secured in spaced relation at their other ends 48 by a bolt device 49. By this arrangement, the arms 46 are adapted to move as a unit vertically between a rest element 51, secured transversely between the two rear members 37, and a locking device 52 rotatably connected between the members 37 at a position spaced above the rest element 51.

A counterweight member 53 (FIG. 2) is threadably mounted on a threaded rod 50 secured to an element 55 depending from and secured to the front flange 54 (FIG. 3) of the member 43 as by a bolt 56, extended substantially horizontally through the flange 54. A transversely extended bar 57 is adjustably mounted on the outer exposed end of the bolt 56 and includes a pair of transversely spaced notches 58 and 59 (FIG. 2) formed therein. Depending from each notch 58 and 59 are a pair of parallel rods 61 and 62 each having a hooked portion 63 on the lower end thereof. A pair of the usual balancing weights 64 and 66 (FIG. 2) are hung on the scale beam arms 46.

For the purpose of transmitting weight from the cage 18 to the weight indicating unit 14, a weight transmitting unit comprising the pair of horizontally disposed T-bar units 16 and 17 is provided. As each T-bar unit is identical to the other and mounted to the stationary frame 11 in the same manner, only one shall be described.

The T-bar unit 17 (FIG. 2) includes an elongated center bar 69 which extends centrally and longitudinally of the top frame device 13. The bar 69 has one end 71 thereof pivotally connected to the hooked portion 63 of the rod 61 depending from the scale beam unit 44. At the other end of the bar 69, a U-shaped element 72 is secured thereto which includes a transversely extended portion 73 spaced inwardly from the end 74 of the bar 69, and a pair of parallel side portions 76 extended longitudinally of and toward the corners of the top frame device 13. Another transversely extended member 77, shorter than the transverse portion 73, is secured to the end 74 of the bar 69 and is also connected to a pair of parallel side members 78 each of which is spaced slightly inwardly from the adjacent parallel side portions 76.

The respective side portions 76 and side members 78 are connected by a pair of transversely extended wedge shaped portions 79 and 81 (FIG. 4), the outermost portion 81 having a wedge shaped projection 82 extended outwardly from the side portion 76. Of note, the lower edge (not shown) of the projection 82 and the upper edge 79a of the portion 79 are knife-like. For the purpose of mounting the T-bar unit 17 to the stationary frame 11, a pair of transversely opposed, circular, cradle-like structures 83 (FIG. 2) are secured to the upper inside ends of each pair of transversely opposed upright posts 28. Thus, by inserting each projection 82 into a structure 83, it may be seen that the T-bar unit 17 is adapted to rock upon the knife edge fulcrum provided by each of the projections 82. Each innermost wedge shaped portion 79 has suspended therefrom a C-shaped member 84 (FIG. 4) for a purpose to appear hereinafter.

The weight receiving cage 18 (FIG. 1) includes four upright angle members 86 connected at their upper ends by parallel side members 87 and end members 88, and at their lower ends by parallel side members 89 and end members 91 (only one of which is shown). The sides of the cage are enclosed by a plurality of longitudinally extended boards 92 secured at their ends to the respective upright members 86. Additionally, longitudinally extended rods 90 may be secured between the upper end members 88 so as to shield the T-bar units from an animal being weighed.

The gate 19 is of a conventional type adapted to hingedly close with the cage 18 and includes upright bars 93. The sliding door 21, at the end of the cage 18 opposite the gate 19, includes an upright panel 94 secured at the bottom to a transversely extended strap 96 having bifurcated ends 97 adapted to fit over a member 86 as indicated (FIG. 1). The panel 94 is adapted to slide through a space provided between an end member 88 and a curved strap (not shown) attached at its ends to the member 88. The cage 18 is provided further with a bottom platform 98, secured between the members 89 and 91, for the animals to stand upon while being weighed.

To suspend the weighing cage 18 from the weight transmitting T-bar units 16 and 17, the cage is provided at each upper corner with a short, transversely extended, wedge shaped, knife-edged piece 99 (FIG. 4) secured to a pair of upstanding members 101 mounted on a side member 87. Thus, by hooking each C-shaped member 84 beneath a respective piece 99, the cage 18 is rockably suspended from the portions 81 of the T-bar units. To prevent the cage 18 from swaying too much during use, the hold down units 27 (FIG. 1) are adapted to be pivotally mounted to the underside of the bottom platform 98 of the cage.

In use, an animal to be weighed is led within the cage unit 18 so as to be supported on and received by the platform 98 thereof. The weight of the animal is then transmitted through the four transverse pieces 99 of the cage to the C-shaped members 84 and then to the pair of fulcrums 79 of the T-bar units 16 and 17. As the downward force on the fulcrums 79 of the T-bar units is intermediate the portions 82 (FIG. 4) and the inner ends 71, each unit is caused to rock about the knife edged portions 82 such that the inner ends 71 pivot downwardly. The downward force of the ends 71 is then transmitted through the rods 61 and 62 to the bar 57 of the scale beam unit 44.

The resulting downward force on the bar 57 of the scale beam unit 44 pivots the scale beam arms 46 about their projections 42, which pivotal movement is then compensated for by movement of the weights 64 and 66 until the rear ends of the arms 46 touch the bolt device 49. When the arms 46 are thus balanced, the weight of the animal is registered.

To obtain the true weight of the animal being weighed, the scale reading on the arms 46 is multiplied by the ratio of the distances from each of the portions 79 and 81 of a T-bar unit to the inner end 71 thereof. Should the scale be weighing light or heavy, the counterweight member 53 may be threaded inwardly or outwardly on the rod 50 as the case may be. Of note, the purpose for the cut-out 36 in the member 34 is to act as a limit to the downward pivotal movement of the scale beam arms 46, in that the counterweight member 53 will nestle therein. The purpose for the locking device 52 is to lock the arms 46 against the rest element 51 when the unit 14 is not in use.

Although only one embodiment of the invention has been disclosed and described, the invention is not to be so limited, as various modifications and alternate constructions may be made within the full scope of the invention as defined by the appended claim.

I claim:

A weighing apparatus comprising stationary means including a connected pair of rectangularly shaped top and bottom frame devices, means including a cradle structure secured at each corner of said top frame device, weight indicating means secured to said top frame device and including a scale beam having a pair of separate rods depended therefrom, horizontally disposed rectangular weight transmitting means including a pair of T-bar units each of which has at the T end thereof a first pair of opposed, transversely extended knife edged elements rockably mounted in said cradle structures, said T-bar units having free ends located centrally of said top frame device and connected to said rods, a second pair of transversely opposed knife edged elements secured to each T-bar unit intermediate said first pair and said free ends, a hanger member suspended from each of said second pair of elements, and cage means including a box frame having a third pair of transversely opposed knife edged elements secured to each end of said box frame, said third pair of elements rockably mounted on said hanger members.

References Cited in the file of this patent

UNITED STATES PATENTS

| | | |
|---|---|---|
| 71,179 | Jackson | Nov. 19, 1867 |
| 1,175,604 | Clifford | Mar. 14, 1916 |
| 1,182,073 | Bousfield | May 9, 1916 |
| 1,383,504 | Weber | July 5, 1921 |
| 1,506,879 | Bagg | Sept. 2, 1924 |
| 1,838,985 | Bousfield | Dec. 29, 1931 |
| 2,035,982 | Robinson et al. | Mar. 31, 1936 |
| 2,204,389 | Vater et al. | June 11, 1940 |
| 2,793,024 | Rose et al. | May 21, 1957 |